United States Patent
Mohammad et al.

(10) Patent No.: US 10,055,920 B2
(45) Date of Patent: Aug. 21, 2018

(54) METHOD TO FACILITATE COMMUNICATION BETWEEN A LOCK AND A KEY

(71) Applicant: Robert Bosch GmbH, Stuttgart (DE)

(72) Inventors: Zubair Mohammad, Singapore (SG); John Draper, OGF Daventry (GB); Stefan Ferber, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/818,900

(22) Filed: Nov. 21, 2017

(65) Prior Publication Data
US 2018/0144571 A1 May 24, 2018

(30) Foreign Application Priority Data
Nov. 24, 2016 (EP) .................................. 16200538

(51) Int. Cl.
*G07C 9/00* (2006.01)
*H04B 5/00* (2006.01)

(52) U.S. Cl.
CPC ..... *G07C 9/00309* (2013.01); *G07C 9/00103* (2013.01); *G07C 9/00111* (2013.01); *G07C 2009/00357* (2013.01); *G07C 2009/00388* (2013.01); *H04B 5/0056* (2013.01)

(58) Field of Classification Search
CPC ............ E05B 47/0012; G07C 9/00174; G07C 2009/00793; G07C 2009/00357; G07C 2009/00388; G07C 9/00103; G07C 9/00309; G07C 9/00896; G07C 9/00857; G07C 9/00563; G07C 9/00111; B60R 25/00; H04B 5/0056

USPC .................................... 340/5.61, 5.73, 10.33
See application file for complete search history.

(56) References Cited

U.S. PATENT DOCUMENTS

| 7,999,656 B2 * | 8/2011 | Fisher | G07C 9/00103 340/5.73 |
| 9,845,617 B2 * | 12/2017 | Forsberg | E05B 47/0012 |
| 2015/0324744 A1 | 11/2015 | Fokkelman | |

FOREIGN PATENT DOCUMENTS

| DE | 10 2014 219 502 A1 | 3/2016 |
| EP | 0 670 402 A1 | 9/1995 |
| GB | 2 340 644 A | 2/2000 |
| WO | 2008/145199 A1 | 12/2008 |
| WO | 2015/149910 A1 | 10/2015 |

* cited by examiner

*Primary Examiner* — Ali Neyzari
(74) *Attorney, Agent, or Firm* — Maginot, Moore & Beck LLP

(57) ABSTRACT

Method to facilitate communication, between a lock and a key, with at least one of the lock and the key being equipped with an emitter for emitting radio frequency signals and at least the other one of the lock and the key being equipped with a receiver for receiving this radio frequency signal, comprising the steps of: a) receiving the radio frequency signal from the emitter; b) recovering a bit stream encoded in the radio frequency signal; and d) transmitting the bit stream to a server for the bit stream to be transmitted from the server to an electronic device for transmitting a second radio frequency signal to the receiver, wherein the second radio frequency signal encodes the bit stream.

13 Claims, 4 Drawing Sheets

METHOD TO FACILITATE COMMUNICATION BETWEEN A LOCK AND A KEY

This application claims priority under 35 U.S.C. § 119 to patent application number EP 16200538.3 filed on Nov. 24, 2016 in Europe, the disclosure of which is incorporated herein by reference in its entirety.

The invention concerns a method to facilitate communication between a lock and a key, a method for secure communication between the lock and the key, electronic devices configured for use in these methods, a systems a computer program configured to carry out these methods and a machine-readable storage medium on which the computer program is stored.

BACKGROUND OF THE INVENTION

EP 0 570 402 A1 discloses a method for generating a sequence of encoded data bits for a remote keyless system.

WO 201511149 910 A1 discloses a method for storing a transmission in a motor vehicle, comprising the steps of generation of a temporary digital key, transmission of the digital key to a control device of the motor vehicle using a communication device in the motor vehicle and storage of the key in the control device.

US 2015/0324744 A1 discloses a system for delivering shipping items in vehicles which includes a first communication module establishing a communication link to a communication terminal of a delivery person, the communication terminal receiving authorization data via a communication network; a first identification routine unambiguously identifying a delivery person; a second communication module establishing, via a wireless communication network, a communication link to a communication device of a control unit of the access arrangement on a vehicle; a second identification routine for unambiguously identifying the system by the access arrangement; a third communication module for receiving update request data from the driver; and an update routine for updating authorization data in a memory of the system, Upon updating authorization data, information is wirelessly transmitted relating to the successful delivery and the content of the delivery to the access arrangement. The driver assistance system displays an alert message about the delivery.

ADVANTAGES OF THE INVENTION

The method with the features of independent claim 1 has the advantage that it provides a simple way to facilitate remote communication between a lock and a key for unlocking this lock, if lock and key are configured to communicate with each other using radio frequency signals.

The term 'key' ay encompass portable devices that are used in remote keyless systems to unlock the lock like e.g. a key fob.

'Remote communication' may mean communication over a distance between key and lock at which key and lock are not designed to communicate With each other normally.

Further advantageous developments can be found in the further claims.

SUMMARY OF THE INVENTION

The method pertains to aforementioned key/lock systems in which at least one of the lock and the key is equipped with an emitter for emitting radio frequency signals and at least the other one of the lock and the key is equipped with a receiver for receiving this radio frequency signals.

This method comprises the steps of receiving the radio frequency signal from the emitter (which is located in either key or lock), recovering a bit stream encoded in the radio frequency signal, optionally sending the recovered bit stream to another device (for example a portable communication device) via near field communication and transmitting the bit stream to a server for the bit stream to be transmitted from the server to the other one of either key or lock.

The term 'transmitting the bit stream to a server' may encompass any form of wireless transmission, such as but not limited to a cellular data connection like (TCP/IP/IUDP via 2G/3G/4G).

The radio frequency signals may be in the range of 433 MHz or 866 MHz and encode a bit stream, e.g. encoded as quadrature modulated signals (also known as 10 signals). By extracting the bit stream from the radio frequency signal and transmitting the bit stream instead of a full radio frequency sample to the server enables the transmission of the signal from the emitter to the receiver via a cellular data connection.

This method allows another person like a postman or neighbors or other trusted parties to make use of the remote key in a controlled manner without the local physical presence of the key to unlock the lock.

It sender and receiver use methods for secure communication, the method according to claim 1 also facilitates secure communication.

In another aspect, the step of transmitting the bit stream to the server can be carried out by a portable communication device, for example a cell phone, a smartphone, or a tablet computer. This provides for a very simple way to establish the remote communication capability.

It is then possible that the portable communication device receives the bit stream via near field communication, for example Bluetooth, from a first electronic device that carries out the step of recovering the bit stream.

In other words, when the key is equipped with the emitter and the user of the key presses the unlock button, the first electronic device may be configured to capture the radio frequency data stream, optionally identify the type of radio frequency modulation, convert the analog waveform into the bit stream, embed this bit stream into bytes. optionally encrypt it, and transmit it. In a further aspect, the method may further comprise the steps of receiving the bit stream from the server, optionally sending the bit stream to another device, converting the bit stream to the second radio frequency signal and transmitting this second radio frequency signal to the receiver.

The conversion of the bit stream to the second radio frequency signal may be carried out by a method that is inverse to the aforementioned method for extracting the bit stream. Thereby, the radio frequency signal and the second radio frequency signal correspond to each other.

It may be envisaged that the step of receiving the bit stream from the server is carried out by a second portable communication device, for example a cell phone, a smartphone, or a tablet computer Again, this provides for a very simple way to establish the remote communication capability.

It is then possible that the second portable communication device sends the bit stream via near field communication, for example Bluetooth, to a second electronic; device that carries out the step of converting the bit stream to the second radio frequency signal.

If both key and lock are equipped with an emitter each for emitting radio frequency signals and a receiver each for receiving radio frequency signals, i.e. if bi-directional communication between key and lock via radio frequency signals is possible, it may further be envisaged that the key and the lock perform a bi-directional communication like e.g. a challenge-response algorithm to ensure security of the communication, in which the respective radio frequency signals are remotely transmitted from the emitter to the receiver e.g. via the cellular data connection.

In a further aspect of the invention, it may be envisaged to have an electronic device, preferably a portable electronic device, for use in the described methods that is configured to carry out the steps of receiving the radio frequency signal from the emitter, recovering the bit stream encoded in the signal and sending the recovered bit stream via near field communication.

In another further aspect of the invention, it may be envisaged to have an electronic for use in the described methods that is configured to carry out the steps of receiving the bit stream via near field communication, converting the bit stream to the second radio frequency signal and transmitting this second radio frequency signal to the receiver.

Such electronic devices implementation of the above methods with standard components.

In further aspects it may be envisaged have systems that comprise both the aforementioned portable communication device and the corresponding electronic device that communicate with each other via e.g. near field communication.

Such a system may be envisaged on the side of the sender of the radio frequency signal, i.e. the electronic device is configured to receive the radio frequency signal, recover the bit stream and transmit the bit stream via near field communication to the portable communication device, which is configured to then wirelessly transmit the bit stream to the server.

Alternatively or additionally, such a system may be envisaged on the side of the intended recipient of the radio frequency signal, i.e. the portable communication device is configured to receive the bit stream from the server, and transmit it to a second electronic device via near field communication. The electronic device is then configured to receive this bit stream, convert it to the second radio frequency signal and emit this second radio frequency signal ready for reception by the intended recipient.

Such systems can be most conveniently employed to carry out any of the above methods with standard components.

In yet further aspects, it may be envisaged to have a computer pro ram that is configured to carry out all steps of any one of the above methods if the computer program runs on a computer.

It may then further be envisaged to have machine-readable storage medium on which this computer program is stored.

BRIEF DESCRIPTION OF THE DRAWINGS

The invention is explained in more detail below with reference to drawings, in which, schematically.

FIG, 1 shows a system for remote communication between key arid lock.

Figure 5:
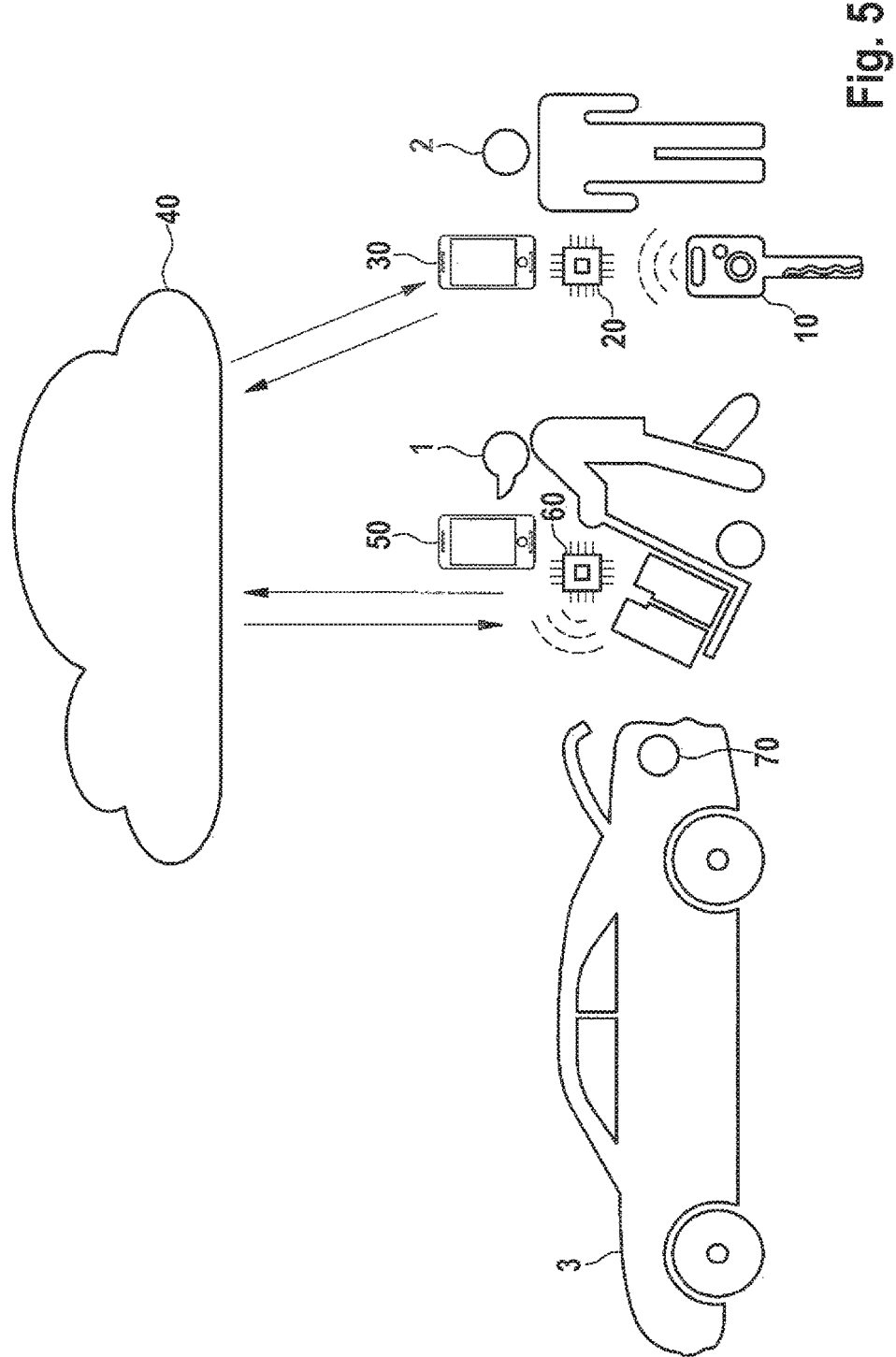

FIG, 4 shows a flow chart diagram that illustrates one aspect of the invention;

FIG. 5 shows a flow chart diagram that illustrates another aspect the invention.

DETAILED DESCRIPTION OF THE EMBODIMENTS

Figure 1:
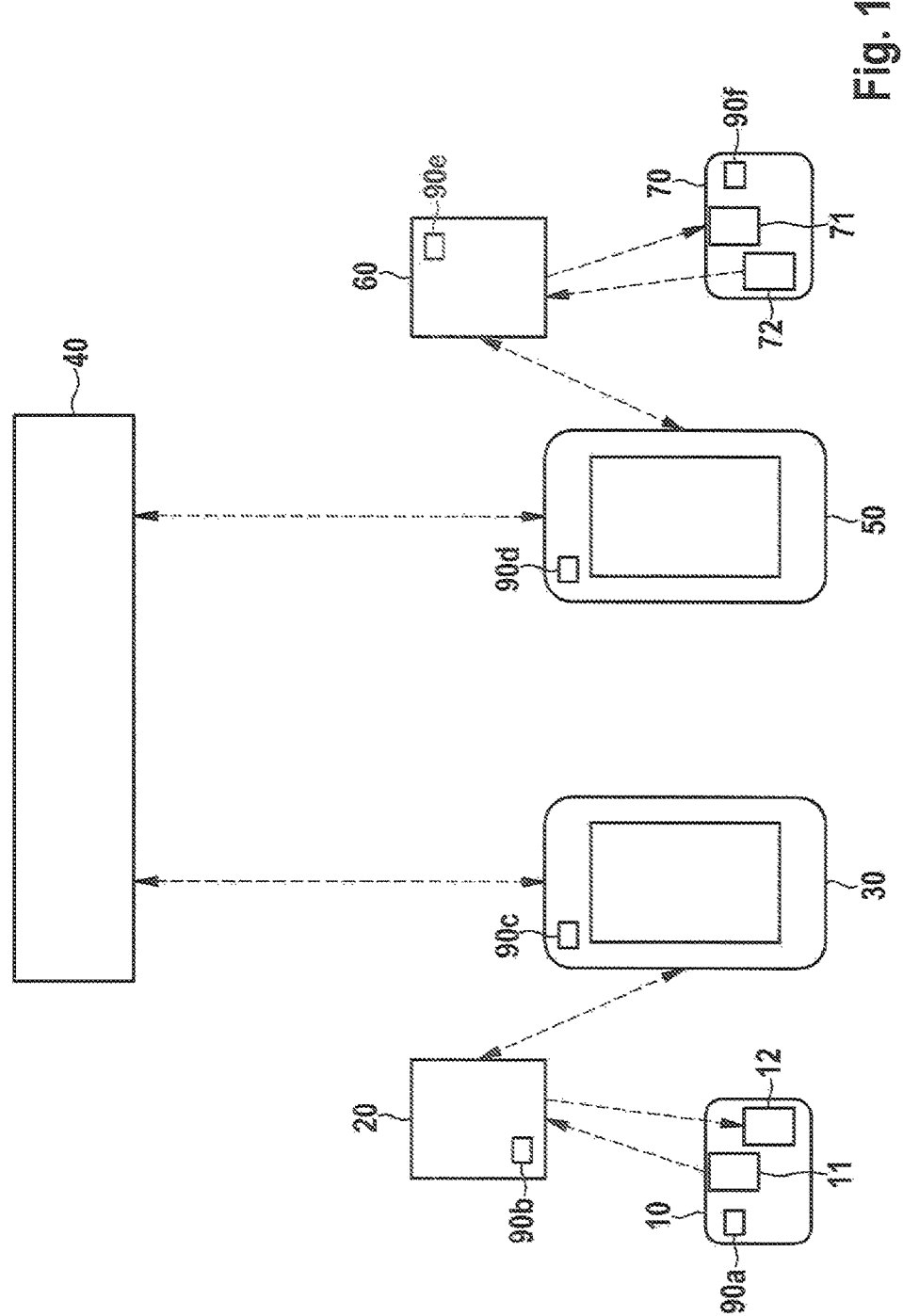

The embodiment illustrated in FIG. 1 concerns key 10 having an emitter 11 for emitting radio frequency signals and a look 70 having a receiver 71 configured to receive the radio frequency signals. The key 10 may encode a bit stream representing the command in the radio frequency signal using for example quadrature modulation. This command may the command for the lock 70 to unlock.

Of course the discussion of 'unlocking' the lock 70 is not limited to this specific command. The same method may be used to transmit other signals between key 10 and lock 70, e.g. a command to 'lock' the lock 70.

Under normal operating conditions, when key 10 and lock 70 are in proximity to each other, the lock's receiver 71 receives the radio frequency signal, recovers the bit stream and unlocks the lock 70. Conveniently, the radio frequency signal may be in the range of 433 MHz or 866 MHz.

It is possible that key 10 and lock 70 uses one of the following methods to ensure secure communication between each other.

It is possible for them to use a method known as 'on-time-code and one-direction command' to the person skilled in the art in this case the key 10 sends just one and always the same radio frequency signal to the lock 70.

Another way to ensure secure communication is a method known as 'changing-code and one-direction command' to the person skilled in the art. In this method the key 10 sends just one but always a different radio frequency signal to the lock 70.

It is further possible for them to use a method known as 'changing-code and two-direction challenge response' to the person skilled in the art. In this method the key 10 sends one code to the lock 70, the lock 70 responds with a shared secret, which is also known as a 'challenge', and the key 10 responds to this challenge. If the key's 10 response is deemed correct by the lock 70, the lock unlocks.

It key 10 and lock 70 are not in proximity but remote from each other, the receiver 71 is no longer capable of receiving radio frequency signals emitted from the sender 11.

To enable distal communication between key 10 and lock 70, it is possible to transmit the information contained in the radio frequency signal via a server 40, which is commonly known as 'the cloud'.

In the embodiment, smartphones 30 and 50 communicate with the server 40 to transmit the information contained in the radio frequency signal.

The issue with capturing the radio frequency signal is the radio frequency sample rate. A typical file size for storing a captured radio frequency signal, which of course may vary depending on sample rate, bandwidth, length of time of the capture and latency of transmission can be on average approximately 160 MB for around 5 seconds worth of captured data, thus making data transmission over e.g. a cellular network extremely slow.

To this end, the electronic device 20 is configured to receive the radio frequency signal from the emitter 11, extract the encoded bit stream, and pass the bit stream on to the smartphone 30. The smartphone 30 in turn is configured to pass the extracted bit stream on to the server 40.

The smartphone 50 is configured to receive this bit stream from the server 40, and passes it on to an electronic device 60. The electronic device 60 is configured to convert the received bit stream back to a radio frequency signal, and emit this radio frequency signal.

This radio frequency signal is then received by the lock's receiver 71. The receiver 71 is configured to extract the bit stream e.g. by using inverse quadrature modulation and decode from the bit stream the signal that is encoded in the bit stream The lock 70 is configured to then act according to this signal.

Optionally, e.g. if key 10 and lock 70 are to use 'changing-code and two-direction challenge response', look 70 may be equipped with an emitter 72 for emitting radio frequency signals and the key 10 may be. equipped with a receiver 12 tot receiving this radio frequency signal.

Lock 70 may then be configured to encode the signal that is to be transmitted to key 10 in a bit stream that is then encoded in a radio frequency signal. It is further configured to emit the radio frequency signal via emitter 72.

Electronic devices 60 and 20 then swap their roles with respect to the aforementioned method to transmit a signal from key 10 to lock 70, as do smartphone 30 and 50. That is to say the system is configured to extract the bit stream from the radio frequency signal, and transmit it via electronic device 60, smartphone 50, server 40, smartphone 30 and electronic device 20 to keys receiver 12. The key 10 is then configured to extract the command from the bit stream encoded in the radio frequency signal received from electronic device 20 and act accordingly.

Electronic device 20 and/or electronic device 60 may be realized as devices separate from smartphones 30 and 50. If electronic device 20 and smartphone 30 are realized as separate devices, they may communicate via near range communication like e.g. Bluetooth. Likewise, if electronic device 60 and smartphone 50 are realized as separate devices, they may communicate via near range communication like e.g. Bluetooth.

Alternatively, electronic device 20 may be realized within smartphone 30 and/or electronic device 60 may be realized within smartphone 50.

Figure 2:
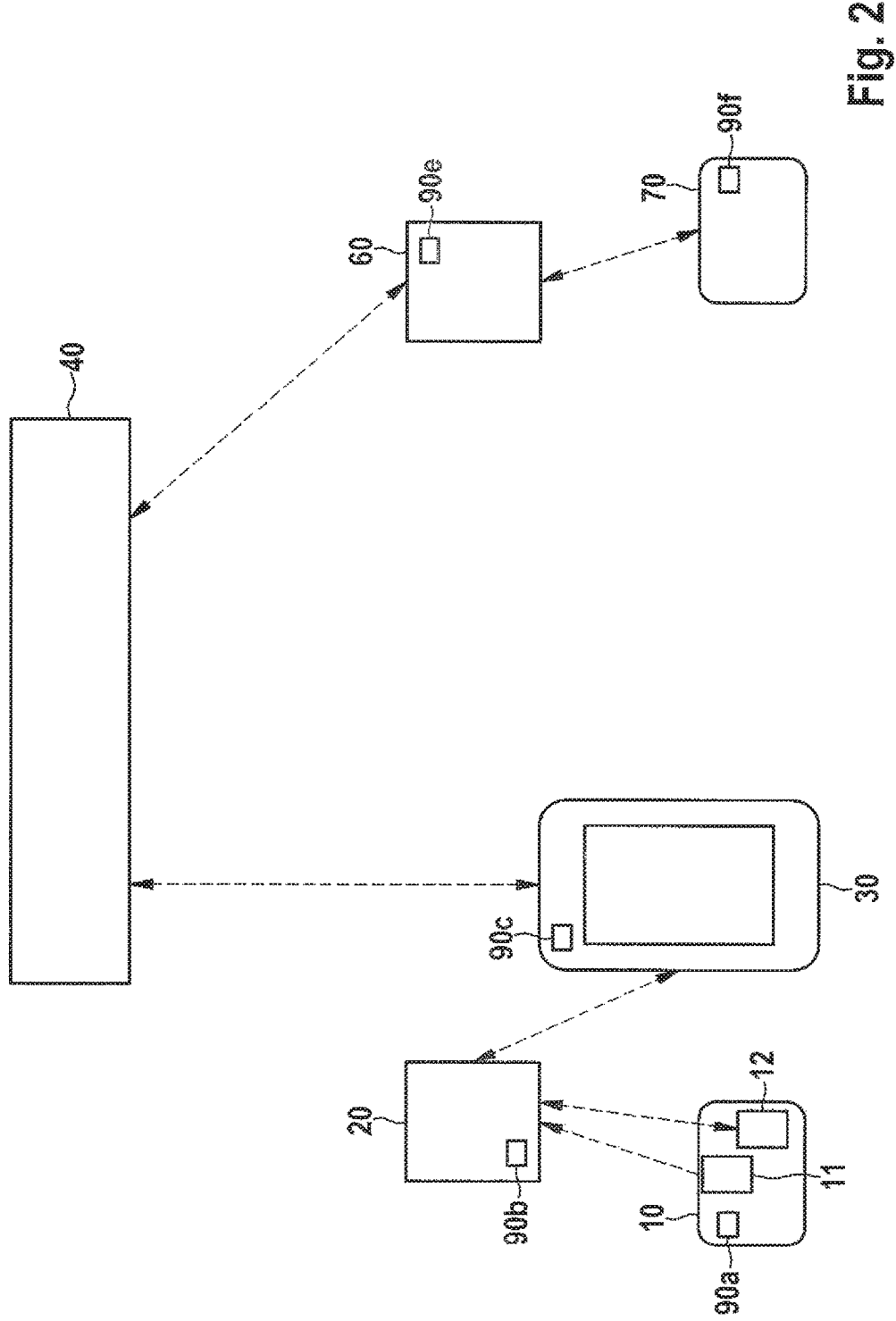
FIG. 2, Shows another system for re le communication between key and lock.

As further alternatives, it is possible that smartphone 50, electronic device 60 and lock 70 do not communicate with each other, but are realized in an integrated device. In such a system, which is illustrated in FIG. 2, there is no need for radio frequency communication between electronic device 60 and lock 70. Hence electronic device 60 may be configured to receive the bit stream directly from the server 40, and pass it on to lock 70, which is configured to extract the bit stream encoded in the bit stream.

If the lock 70 is to send instructions back to key 10, it can be configured to convert these instructions to a bit stream, and pass this bit stream on to server 40 via electronic device 60.

Figure 3:
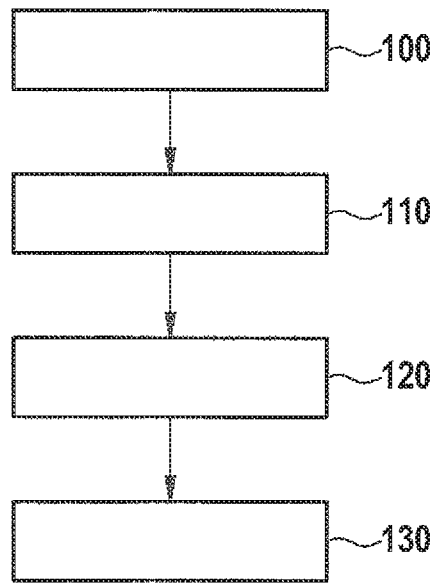
FIG. 3 shows a method for delivering shipments.
Figure 4:
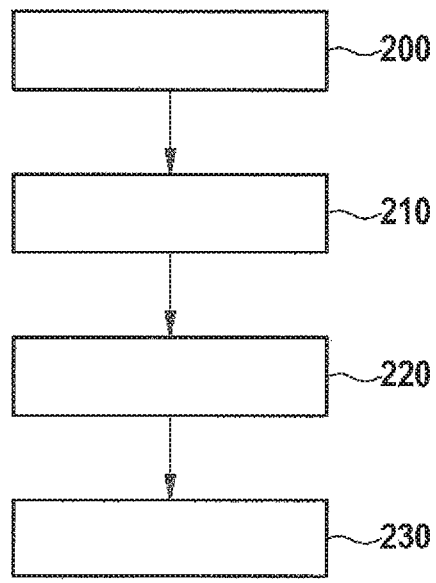

FIGS. 3 and 4 illustrate methods according to different possible aspects of the invention. These methods may be executed using a system illustrated in FIGS. 1 and 2, for example by means of computer programs that are configured to carry out these methods if executed. These computer programs may be stored on machine-readable storage media 90a, . . . 90f.

FIG. 3 illustrates a method for uploading instructions encoded in radio frequency signals from key 10 or lock 70 to server 40. The description will focus the case of passing signals from key 10 to server 40. The analogous method of course holds for the case of passing signals from lock 70 to server 40.

A radio frequency signal is received (100) from emitter 11. The bit stream encoded in this radio frequency signal is then extracted (110) and optionally sent (120) to the portable communication device like e.g. smartphone 30, e.g. by using near range communication. Then, the bit stream is sent (130) to server 40.

FIG. 4 illustrates a method for downloading instructions encoded in a bit stream from server 40, and passing it on to lock 70. The analogous method of course holds for the case of downloading instructions encoded in a bit stream from server 40 and passing it on to key 10.

The bit stream is received (200) and optionally sent (210) to an electronic device 60, e.g. by using near range communication. The bit stream is then converted (220) to a radio frequency signal and transmitted to receiver 71.

FIG. 5 illustrates a use case of this invention in delivering shipments. More specifically, the illustrated use case is that of a delivery person 1 that is to deliver a shipment to customer 2. The shipment is to be placed in vehicle 3 which belongs to customer 2.

Delivery person 1 uses smartphone 50 to send a notification to smartphone 30 that the shipment is ready to be placed in the trunk of car 3, but car 3 is locked. Customer 2 may then use key 10 to unlock the car. Key 10 emits a radio frequency signal that is emitted for reception by lock 70, but cannot be received because key 10 and lock 70 are remote from each other. Customer 2 may carry electronic device 20 that receives the radio frequency signal, and passes it on to lock 70 via smartphone 30 sewer 40, smartphone 50 and electronic; device 60 which the delivery person may carry to look 70 as described above. Lock 70 may then unlock ready for the shipment to be placed in the trunk. Upon completion, smartphone 50 may then be used to send a notification to smartphone 30. And user 2 may use key 10 to remotely lock the lock 70 as before.

The invention claimed is:

1. A method of facilitating communication between a lock and a key, at least one of the lock and the key being equipped with an emitter configured to emit radio frequency signals, at least the other one of the lock and the key being equipped with a receiver configured to receive radio frequency signals, the method comprising:
   receiving a first radio frequency signal from the emitter of the at least one of the lock and the key;
   recovering a bit stream encoded in the first radio frequency signal; and
   transmitting the recovered bit stream to a server, the bit stream being transmitted from the server to the other one of the lock and the key.

2. The method according to claim 1, wherein the transmitting of the bit stream to the server is carried out by a first portable communication device.

3. The method according to claim 2, wherein the first portable communication device receives the bit stream via near field communication.

4. The method according to claim 1, further comprising:
   receiving the bit stream from the server;
   converting the received bit stream to a second radio frequency signal; and
   transmitting the second radio frequency signal to the receiver.

5. The method according to claim 4, wherein the receiving of the bit stream from the server is carried out by a portable communication device.

6. The method according to claim 5, wherein the portable communication device sends the bit stream via near field communication.

7. The method according to claim 1, wherein both the key and the lock are equipped with the emitter configured to emit radio frequency signals and the receiver configured to receive radio frequency signals, wherein the key and the lock perform a challenge-response algorithm to ensure security of the communication.

8. The method according to claim 1, wherein an electronic device is configured to carry out the receiving of the first radio frequency signal from the emitter, the recovering of the bit stream encoded in the first radio frequency signal, and sending of the recovered bit stream via near field communication.

9. The method according to claim 4, wherein an electronic device is configured to carry out receiving of the bit stream via near field communication, the converting of the bit stream to the second radio frequency, and the transmitting of the second radio frequency signal to the receiver.

10. A system for facilitating communication between a lock and a key, at least one of the lock and the key being equipped with an emitter configured to emit radio frequency signals, at least the other one of the lock and the key being equipped with a receiver configured to receive radio frequency signals, the system comprising:
a first electronic device configured to:
receive a first radio frequency signal from the emitter of the at least one of the lock and the key;
recover a bit stream encoded in the first radio frequency signal; and
send the recovered bit stream via near field communication; and
a first portable communication device configured to:
receive the bit stream via near field communication; and
transmit the bit stream to a server, the bit stream being transmitted from the server to the other one of the lock and the key.

11. The system according to claim 10, further comprising:
a second portable communication device configured to:
receive the bit stream from the server; and
send the bit stream via near field communication; and
a second electronic device configured to:
receive the bit stream via near field communication;
convert the received bit stream to a second radio frequency signal; and
transmit the second radio frequency signal to the receiver.

12. The method of claim 1, wherein the method is carried out by a non-transitory computer program.

13. The method of claim 1, wherein the computer program is stored on at least one machine-readable storage medium.

* * * * *

UNITED STATES PATENT AND TRADEMARK OFFICE
CERTIFICATE OF CORRECTION

Page 1 of 1

PATENT NO. : 10,055,920 B2
APPLICATION NO. : 15/818900
DATED : August 21, 2018
INVENTOR(S) : Mohammad et al.

It is certified that error appears in the above-identified patent and that said Letters Patent is hereby corrected as shown below:

In the Claims

In Column 7, Lines 10-14, Lines 1-5 of Claim 9 should read:
9. The method according to claim 4, wherein an electronic
device is configured to carry out receiving of the bit stream
via near field communication, the converting of the bit
stream to the second radio frequency signal, and the transmitting of
the second radio frequency signal to the receiver.

Signed and Sealed this
Thirtieth Day of April, 2019

Andrei Iancu
*Director of the United States Patent and Trademark Office*